United States Patent Office 3,666,624
Patented May 30, 1972

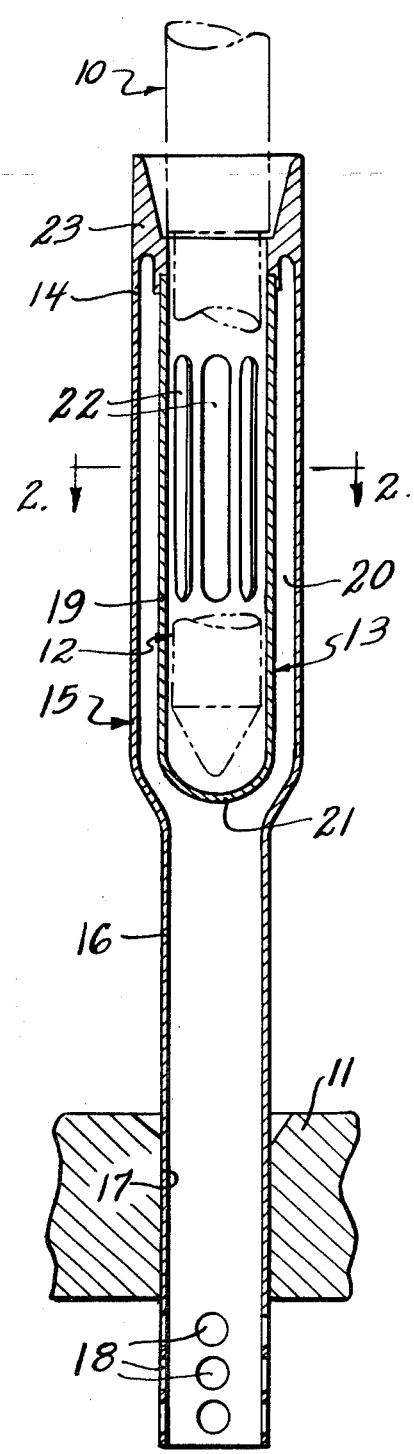
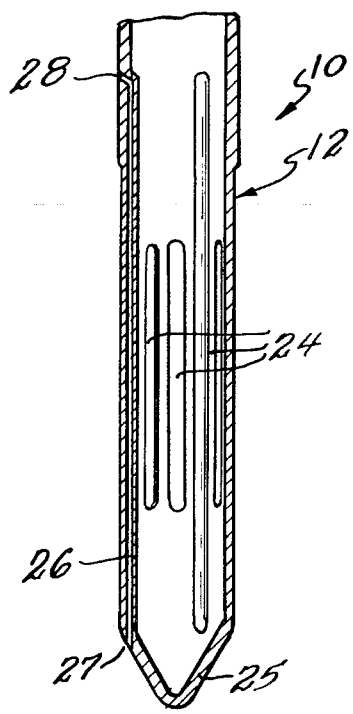
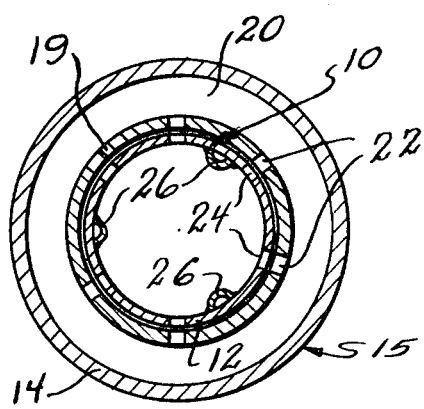

3,666,624
HYDRAULIC HOLD-DOWN FOR NUCLEAR REACTOR FUEL ASSEMBLY
Lester M. Finch and Andy J. Anthony, Pasco, Wash., assignors to the United States of America as represented by the United States Atomic Energy Commission
Filed July 18, 1969, Ser. No. 842,898
Int. Cl. G21c 15/22
U.S. Cl. 176—64                    1 Claim

ABSTRACT OF THE DISCLOSURE

An assembly for use in a nuclear reactor includes a fuel assembly having a nose piece at its lower end and a support receptacle having a socket which receives the nose piece. Openings in the nose piece and socket conduct coolant into the nose piece perpendicular to the longitudinal axis of the fuel assembly. Leakage flow vents extend the length of the nose piece communicating with the interior of the socket below the nose piece and the exterior of the fuel assembly above the top of the receptacle to reduce the lifting effect of the coolant on the fuel assembly.

CONTRACTUAL ORIGIN OF THE INVENTION

The invention described herein was made in the course of, or under, a contract with the United States Atomic Energy Commission.

BACKGROUND OF THE INVENTION

This invention relates generally to means for mounting a fuel assembly in a nuclear reactor to minimize the lifting effect of a coolant passing upwardly therethrough. In more detail, the invention relates to a hydraulically balanced coolant inlet for liquid-metal-cooled fuel assemblies for a nuclear reactor.

Fuel assemblies often rest on a grid plate in a nuclear reactor and coolant passes upwardly therethrough from an inlet plenum beneath the grid plate. This is true of power reactors in general and particularly so for fast breeder reactors which are cooled by circulating a liquid metal therethrough. The upward flow of the coolant through the fuel assembly together with other forces working on the assembly may create enough lift to overcome the weight of the assembly and lift the assembly from the grid plate. This lifting effect has usually been overcome by providing mechanical hold-down clamps or weights which positively prevent upward movement of the fuel assembly. A mechanical solution of this type —although effective—generally necessitates the inclusion of cumbersome and expensive additions to the structure of the reactor. These may even interfere with coolant flow. It should be noted that any such additions to the structure of the reactor must provide for the removal of damaged or depleted fuel assemblies and replacement thereof with fresh fuel assemblies.

Recently it has been proposed that the inlet nozzle of the fuel assembly be modified so that hydraulic forces acting on the assembly are balanced in such a way that the weight of the assembly is sufficient to hold it down. One approach is to employ venturi effects to limit the upwardly acting forces of a coolant flowing longitudinally into and through the fuel assembly nozzle. Another approach is to employ coolant inlet orifices perpendicular to the longitudinal axis of the fuel assembly. It is stated that utilization of both of these expedients will permit any rate of coolant flow within the reactor without mechanical fuel assembly hold-down devices. It is, however, undesirable to incorporate a venturi constriction in the inlet nozzle since such a constriction increases the pressure needed to drive the coolant through the nozzle at the required flow rate. In addition, to obtain any advantage from the venturi design it is necessary to design the nozzle very carefully to obtain the optimum outlet-to-inlet cross-sectional area.

SUMMARY OF THE INVENTION

According to the present invention, a fuel assembly is provided with an elongated nose piece having openings along the length thereof. This nose piece is received in an elongated socket having a closed bottom and openings along the length thereof forming a part of a support receptacle. Coolant flows upwardly through the receptacle and horizontally into the nose piece. The lifting effect of coolant in the bottom of the receptacle is minimized by leakage flow vents which extend the length of the nose piece and communicate with the interior of the socket below the inlet nozzle and with low pressure coolant outside of the fuel assembly above the top of the receptacle.

BRIEF DESCRIPTION OF THE DRAWING

FIG. 1 is a vertical cross section illustrating the present invention with a fuel assembly nose piece being shown in phantom, FIG. 2 is a horizontal cross section taken on the line 2—2 of FIG. 1, and FIG. 3 is a vertical cross section of the fuel assembly nose piece.

DESCRIPTION OF THE PREFERRED EMBODIMENT

Referring now to the drawing, a nuclear reactor will include a plurality of fuel assemblies 10 supported by a grid plate 11 with a high-pressure coolant zone below the grid plate and a low-pressure coolant zone above the grid plate. For the purpose of explaining the present invention, a single fuel assembly 10 including an elongated nose piece 12 is all that need be shown. Nose piece 12 is received in socket 13 centrally located in enlarged upper portion 14 of receptacle 15. Receptacle 15 also includes a lower portion 16 of smaller diameter which extends through opening 17 in grid plate 11 terminating in the high-pressure coolant zone below the grid plate. Coolant enters receptacle 15 through the bottom of the receptacle and through secondary inlet ports 18.

Socket 13 is formed by a cylinder 19 spaced from and concentric with upper portion 14 of receptacle 15 to leave an annular channel 20 therebetween. Cylinder 19 is closed at the bottom by a concave member 21 and includes a plurality of vertically oriented slots 22 spaced around the periphery of the cylinder. Cylinder 19 and upper portion 14 of receptacle 15 are joined at the top by a closure member 23 having an inwardly tapering top surface to guide nose piece 12 into socket 13. Nose piece 12 includes a plurality of vertically oriented slots 24 spaced about the periphery of the nose piece and aligned with slots 22 in socket 13, a conical tip 25, and also includes three leakage flow vents 26 extending longitudinally along the inside of the nose piece 12 with an inlet 27 communicating with the interior to socket 13 just below the top of conical tip 25 and with an outlet 28 communicating with the low-pressure coolant zone exterior to fuel assembly 10 just above the top of receptacle 15.

In operation, coolant from the high-pressure coolant zone flows upwardly through receptacle 15, makes a right-angle turn and flows into nose piece 12 perpendicular to the longitudinal axis of the fuel assembly, and makes another right-angle turn to flow upwardly through nose piece 12 into fuel assembly 10. Coolant leaks downwardly between cylinder 19 and nose piece 12 to fill the bottom of socket 13 with relatively high-pressure coolant. This pressure will exercise a substantial lifting force on the fuel assembly unless the pressure is relieved in some way. This is accomplished by providing leakage flow vents which permit coolant to flow from the bottom of socket 13, through leakage flow vents 26, and out through outlet 28 to the region of low-pressure coolant outside of the fuel assemblies.

It will be understood that the invention is not to be limited to the details given herein but that it may be modified within the scope of the appended claim.

The embodiment of the invention in which an exclusive property or privilege is claimed are defined as follows:

1. An assembly for use in a liquid-metal-cooled fast breeder nuclear reactor including a fuel assembly having an elongated nose piece having a conical tip and a receptacle adapted to receive said elongated nose piece including an upper portion of enlarged diameter and a lower portion of smaller diameter adapted to be received in a grid plate separating a high-pressure coolant zone from a low-pressure coolant zone within the reactor, said upper portion of enlarged diameter containing a socket centrally located therein, said socket being formed by a cylinder spaced from and concentric with the upper portion of enlarged diameter of the receptacle, said socket being closed at the lower end by a concave member, the upper portion of the receptacle and said cylinder being joined at the top by a closure member having an inwardly tapering top surface which guides the nose piece into the socket, said cylinder and said nose piece containing aligned vertically oriented slots and means for relieving the pressure of coolant in the socket below the nose piece of the fuel assembly comprising a plurality of leakage flow vents extending longitudinally along the inside of the nose piece with an inlet communicating with the interior of the socket just below the top of the conical tip of the nose piece of the fuel assembly and with an outlet communicating with the low-pressure coolant zone of the reactor exterior to the fuel assembly just above the top of the receptacle.

References Cited

UNITED STATES PATENTS

| | | | |
|---|---|---|---|
| 2,961,393 | 11/1960 | Monson | 176—61 X |
| 3,235,465 | 2/1966 | McDaniel et al. | 176—64 X |
| 3,260,649 | 7/1966 | Jens et al. | 176—76 X |
| 3,350,277 | 10/1967 | Costes | 176—87 |
| 3,383,287 | 5/1968 | Jackson | 176—40 |
| 3,401,081 | 9/1968 | Menzel et al. | 176—59 |
| 3,501,377 | 3/1970 | Germer | 176—50 X |

CARL D. QUARFORTH, Primary Examiner

E. E. LEHMANN, Assistant Examiner

U.S. Cl. X.R.

176—87